United States Patent [19]

Thomas et al.

[11] 4,069,040
[45] Jan. 17, 1978

[54] METHOD FOR RECOVERY OF PLATINUM AND IRIDIUM FROM CATALYSTS

[75] Inventors: Maryvonne Thomas, Boulogne Billancourt; Jean Grosbois, L'Isle Adam, both of France

[73] Assignee: Rhone-Poulenc Industries, Paris, France

[21] Appl. No.: 524,777

[22] Filed: Nov. 18, 1974

[30] Foreign Application Priority Data

Nov. 19, 1973  France .................................. 73.41076

[51] Int. Cl.$^2$ ............................................. C22B 11/04
[52] U.S. Cl. .................... 75/101 BE; 75/114; 75/121; 423/22
[58] Field of Search ............... 75/121, 101 BE, 114; 423/22; 252/412, 413

[56] References Cited

U.S. PATENT DOCUMENTS

| 3,473,921 | 10/1969 | Schmuckler | 75/101 BE |
|---|---|---|---|
| 3,656,940 | 4/1972 | Gandon et al. | 75/101 BE X |
| 3,672,874 | 6/1972 | Wiley | 75/101 R |
| 3,725,047 | 4/1973 | Schneider | 75/121 X |
| 3,728,103 | 4/1973 | Lishevskaya et al. | 75/101 BE |
| 3,787,554 | 1/1974 | Ziegler | 423/22 |
| 3,856,912 | 12/1974 | Vesely | 423/22 |
| 3,876,747 | 4/1975 | Pittie et al. | 75/121 X |
| 3,999,983 | 12/1976 | Grosbis et al. | 75/121 X |

OTHER PUBLICATIONS

Merck Index, 7th Edn., 1960, p. 1579.

*Primary Examiner*—G. Ozaki
*Attorney, Agent, or Firm*—McDougall, Hersh & Scott

[57] ABSTRACT

The invention relates to the recovery of the constituent elements of catalysts containing precious metals, such as platinum and iridium deposited on aluminous supports. This recovery is accomplished by a substantially total solubilization of the catalysts by means of hydrochloric acid and by extraction, for example by means of ion exchange resins. This system allows for a good separation of the platinum and the iridium.

12 Claims, No Drawings

METHOD FOR RECOVERY OF PLATINUM AND IRIDIUM FROM CATALYSTS

The invention relates to a method for the recovery and separation of the precious metal entering the composition of certain catalysts, as well as that of the largest part of the alumina which frequently constitutes the support of these catalysts in the form of aluminum salts.

It is well known that certain catalysts, such as reformation catalysts, may include one or several catalytically active metals, and particularly metals of the platinum series, platinum and irridium being among those used most frequently, and that the supports of these catalysts very often are aluminous, and most frequently formed of active alumina.

It goes without saying that the rejects from the fabrication of such catalysts as well as the used catalyst must be treated to recover therefrom at least the precious metals, and this must be as completely as possible.

Generally the methods recommended by prior art for treatment of these catalysts consist of either solubilizing the supports, leaving the unattacked precious metals to be found in the slurries, and the slurries then are treated with acids, or to solubilize all of these catalysts as completely as possible, then to proceed with the separations on the obtained solutions. The solubilization agents may be caustic soda lyes, used with or without pressure, and the current acids used along or in mixture. The different metals then are recovered by treating the solutions of the metal salts, obtained directly or those corresponding to their recovery in the slurries, in case of a selective attack of the support.

Geneally, these different methods include too large a number of operations which, despite the precautions taken, causes substantial losses in precious metals. However, the precious metals frequently present are incompletely separated from each other, which requires further purification treatments which result in a further reduction of the recovery yield.

The object of the present invention is a treatment of used or unused catalysts, comprising at least platinum as a precious metal, and an alumina support, which avoids the described inconveniences by proceeding with an attack by hydrochloric acid which is so conducted that the alumina of the support is substantially completely solubilized, that the platinum is solubilized completely and placed in an ionic form so that it is separated totally by passage over an ion resin or by liquid/liquid exchange, and that the other metals possibly present, particularly iridium, are solubilized at least partially and placed in such a form or being put into such a form that such other metals are not separated with the platinum.

To obtain these results the rejects from new catalysts or the used catalysts, the latter after calcination under oxidizing conditions to eliminate therefrom the deposited carbon, are attacked under reflux by a hydrochloric acid solution of a concentration within the range of 3M to 9M to which possibly a small quantity of concentrated nitric acid is added in amounts up to 5 milliliters per liter of attacking solution, or the equivalent of another oxidizing agent, such as chlorine, chlorites, chlorates and oxidized water. The amount of attack solution ranges from 20 liteers to 6.6 liters per kilogram of catalyst. In this way, there is obtained substantially complete solubilization of the alumina of the support in the form of aluminum chloride, the solubilization of the platinum and the at least partial solubilization of the possibly present iridium, part of which, however, may be found in the form of sludge or slurry. The obtained solution is then treated, if necessary, with a quantity of reducing agent, such as sulfites, nitrites, oxalic and formic acid, which is the case particularly if a slightly oxidizing attack has been employed on the catalysts, as by adding nitric acid, for example. The purpose of this addition of reducing agent is to obtain the iridium in solution in the form of slightly charged trivalent ion complexes; this form is stabilized by the presence of aluminum chloride ions present in the solution. According to the relative quantities of catalyst and of hydrochloric acid attack solution and the concentrations used for the latter, the aluminum chloride may be present in the solutions obtained at a concentration ranging between 1 to 3 moles per liter. Under these conditions, platinum then is the only metal present completely engaged in the form of highly negatively charged ion complexes and can be separated by an extraction with the aid of a suitable liquid or by passage over ion exchange resins. The solution, if it contains iridium, is then treated by the previously indicated oxidizing agents which cause this metal to pass under an ion form analogous to that obtained for platinum, making it possible to extract it in a manner analogous with the one used for the latter metal. The solution then contains the aluminum chloride originating from the attack of the support, and certain metals sometimes present in the catalysts. After possible purification to extract these metals from this solution, it may be used as is or after transformation, particularly into alumina. However, it is found that certain catalysts contain metals, such as bismuth, antimony, tin, ruthenium, palladium and rhenium; the first three of these metals are extracted with platinum, and can be easily separated therefrom by known methods; the last three are extracted very little with platinum, and may be left in it, unless a very high purity platinum is desired and if their proportions are of little importance. It has been stated before that if iridium is present, part may be found in the state of sludge. It goes without saying that in this case these sludges are treated in a known manner to recover the metal therefrom. Naturally, the salts of precious metals, once extracted by ion exchange or by resins, may be recovered in usable form. In the particular case of extraction by resins, one method, known as being particularly appropriate, is the calcination of these resins which directly yields the metals in elementary condition. From there it is easy to pass to the desired derivatives.

It goes without saying that the initial status of the catalysts to be treated, according to the invention, greatly influences the possibility of being placed in as complete a solution as possible. The used catalysts, in particular, are more or less loaded with carbon, as was indicated before, and can be freed from it only by more or less thorough calcination under oxidizing conditions, which makes the precious metals less attackable. The same result is obtained when the catalysts have been used under severe heat conditions. Consequently a more effective oxidizing attack becomes necessary, which forces a return by means of the indicated reducing agents in a more effective manner. In spite of all this, iridium is, in the latter case, then made vulnerable to attack under more difficult conditions and will be found in higher proportions in the sludge than has been heretofore indicated.

To illustrate the present invention, an example of the complete treatment of a catalyst containing both iridium and platinum on aluminous support is given below.

EXAMPLE

A quantity of 5 kilograms catalyst is calcinated for 2 hours at 400° C to destroy the organic substances, then attacked under reflux by 50 liters of 20% by weight (6N) hydrochloric acid and 0.1 liters of 58% by weight nitric acid in an externally heated glasslined reactor. After three hours of attack at a temperature of about 110° C, 0.25 liters formic acid are added and the heating is continued for 1 hour. The solution then is drawn and filtered. A dry residue of 10.5 grams is obtained which essentially contains silica and alpha alumina, with traces of platinum and iridium being present in the residue. Considering its weight which is very small, this corresponds to a substantially complete placement in solution of the precious metals.

The clear solution obtained is maintained at a temperature of 70° C and then passed over a bed of a strong DUOLITE A 101D anion exchange resin, furnished by the firm Dia-Prosim under the trade name Duolite A-101D, on which the platinum becomes strongly fixed, while the effluent solution contains aluminum and almost all of the iridium.

The resin containing the platinum is rinsed with an aqueous solution of diluted 0.1 M hydrochloric acid, then dried and calcined, by heating progressively to 800° C in an oxidizing atmosphere. That way, a metallic mass of 17.6 grams is recovered composed particularly of platinum and containing only very small amounts of iridium.

One liter of 58% nitric acid is added to the effluent solution previously collected and kept under reflux for 1 hour. This solution, in which iridium is thus brought to a valence of IV, is passed over a second anion resin bed under the same conditions as for the operation of fixing the platinum. After calcination of the resin at 800° C, in successively oxidizing and reducing atmosphere, a metallic mass of 2.35 grams iridium free of platinum is obtained.

The recovered quantities of precious metals substantially correspond with the total amount present in the treated catalyst.

We claim:

1. A method for the recovery of constituents of catalysts containing platinum and iridium on an aluminous support, comprising the steps of a. attacking the catalyst with a 3-9 M hydrochloric acid solution to dissolve alumina, platinum and iridium,
   b. adding to the solution a sufficient quantity of reducing agent to convert dissolved iridium to the trivalent state,
   c. passing the solution into contact with an anion exchange medium on which platinum becomes strongly fixed leaving alumina and iridium in solution,
   d. adding an oxidizing agent to the solution from (c) to convert trivalent iridium to the tetravalent state,
   e. passing the solution into contact with an anion exchange medium on which the iridium becomes strongly fixed.

2. The method as claimed in claim 1 in which the attack on the catalyst is carried out under reflux at a temperature above 80° C.

3. The method as claimed in claim 1 in which the hydrochloric acid solution is employed at a rate of 6-20 liters per kilogram of catalyst.

4. The method as claimed in claim 1 in which the catalyst is attacked with a hydrochloric acid solution containing an oxidizing agent.

5. The method as claimed in claim 4 in which the oxidizing agent is selected from the group consisting of chlorine, chlorate, chlorite and hydrogen peroxide in aqueous solution.

6. The method as claimed in claim 4 in which the oxidizing agent is nitric acid in a range of 7 to 5 ml. per l of solution.

7. The method as claimed in claim 1 in which the reducing agent is selected from the group consisting of sulfites, nitrites, oxalic acid and formic acid.

8. The method as claimed in claim 1 in which the solution is heated for a period of time after the addition of the reducing agent.

9. The method as claimed in claim 1 in which the oxidizing agent added to the solution from the first ion exchange to convert iridium from the trivalent to the tetravalent state is selected from the group consisting of nitric acid, chlorine, chlorites, chlorates and hydrogen peroxide in aqueous solution.

10. The method as claimed in claim 1 in which the ion exchange medium in steps (c) and (e) is an anion exchange resin.

11. The method as claimed in claim 10 which includes a step of calcining the anion exchange resin from step (c) to recover the platinum.

12. The method as claimed in claim 10 which includes the step of calcining the anion exchange resin from step (e) to recover the iridium.

* * * * *